(12) United States Patent
Lee et al.

(10) Patent No.: US 6,718,489 B1
(45) Date of Patent: Apr. 6, 2004

(54) ELECTRONIC SERVICE REQUEST GENERATOR FOR AUTOMATIC FAULT MANAGEMENT SYSTEM

(75) Inventors: Bong Jae Lee, Laguna Niguel, CA (US); Kathy Yishin Jaing, Irvine, CA (US); Phen Cheng, Laguna Niguel, CA (US); Scott Lu, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 595 days.

(21) Appl. No.: 09/731,504

(22) Filed: Dec. 7, 2000

(51) Int. Cl.[7] ................................................. G06F 11/00
(52) U.S. Cl. ............................. 714/43; 714/47; 714/57
(58) Field of Search ............................. 714/43, 47, 57

(56) References Cited

U.S. PATENT DOCUMENTS

| | | | | |
|---|---|---|---|---|
| 5,432,715 A | * | 7/1995 | Shigematsu | 364/551 |
| 5,519,830 A | * | 5/1996 | Opoczynski | 371/20 |
| 5,572,672 A | * | 11/1996 | Dewitt | 395/184 |
| 5,581,482 A | * | 12/1996 | Wiedenman | 364/551 |
| 5,704,036 A | * | 12/1997 | Brownmiller | 395/183 |
| 5,812,756 A | * | 9/1998 | Taylor | 395/183 |
| 5,819,028 A | * | 10/1998 | Manghirmalani | 395/185 |
| 5,872,912 A | * | 2/1999 | Brownmiller | 395/184 |
| 6,134,676 A | * | 10/2000 | VanHuben | 714/39 |
| 6,167,538 A | * | 12/2000 | Neufeld | 714/47 |
| 6,233,531 B1 | * | 5/2001 | Klassen | 702/80 |
| 6,249,883 B1 | * | 6/2001 | Cassidy | 714/42 |

OTHER PUBLICATIONS

Microsoft Corp., Enhancements to Management, Secutrity and Availability, 2003, Microsoft Cor. p. 2, http://www.microsoft.com/ntsever/productinfo/terminal/NT4SP4.asp.*

* cited by examiner

Primary Examiner—Nadeem Iqbal
Assistant Examiner—Timothy M. Bonura
(74) Attorney, Agent, or Firm—Alfred W. Kozak; Mark T. Starr; Lise A. Rode (57) ABSTRACT

In an Automatic Fault Management System which monitors components on multiple platforms and workstations, an Electronic Service Generator operates to sense error events and selects an appropriate Formatter unit to develop a report packet for a Remote Service Unit.

3 Claims, 10 Drawing Sheets

ESR ADMIN (SYSTEM INFORMATION)

ELECTRONIC SERVICE REQUEST ADMINISTRATOR

| FORMATTER CONFIGURATION | CENTRAL SERVICE CONFIGURATION | FAULT CRITERIA |

SYSTEM INFORMATION | CUSTOMER INFORMATION

SYSTEM STYLE: * ESR12345678-ZZ

SERIAL NUMBER: * 123456789

SOFTWARE RELEASE:

POLLING INTERVAL (MIN): 2

☑ TRACE ENABLED  2 ▶

*REQUIRED

OK    CANCEL    APPLY    HELP

*FIG. 3*

ESR ADMIN (CUSTOMER INFORMATION)

| FORMATTER CONFIGURATION | CENTRAL SERVICE CONFIGURATION | FAULT CRITERIA |

SYSTEM INFORMATION

- NAME: * UNISYS CORP.
- ADDRESS: * 25725 JERONIMO RD
- ADDRESS (CONT.): MS 199
- CITY: * M.V.
- STATE/PROVINCE: * CA
- POSTAL CODE: * 92691
- CUSTOMER ID: * 123456789

CUSTOMER INFORMATION

- CONTACT: * JAMES KIRK
- PHONE NUMBER: * 949-123-5654
  EXAMPLE: 203-555-1212
- CONSOLE PHONE: 949-123-9999
- REMOTE PHONE: 949-123-9900
- DEPARTMENT: ESR DEV.
- CUIC: * 9991

*REQUIRED

[ OK ] [ CANCEL ] [ APPLY ] [ HELP ]

ESR ADMIN (FORMATTER CONFIGURATION)

ELECTRONIC SERVICE REQUEST ADMINISTRATOR

| SYSTEM INFORMATION | CUSTOMER INFORMATION |
| --- | --- |
| FORMATTER CONFIGURATION | CENTRAL SERVICE CONFIGURATION | FAULT CRITERIA |

COMPUTER NAME: LOCALHOST

EVENT SOURCE: ESRTESTPACKET

FILE NAME: FMTMAINLT.EXE

PORT NUMBER: 7000

[ ADD ]
[ DELETE ]

FORMATTER PROGRAMS
[FMT#]:[COMPUTERNAME]-[EVENTSOURCE]-[FILENAME]-[PORT#]

```
[FMT#]:[LOCALHOST]-[ESRTESTPACKET]-[FMTMAINLT.EXE]-[7000]
[FMT1]:[LOCALHOST]-[FAULTEVENT]-[FMTMAINLT.EXE]-[7001]
[FMT2]:[LOCALHOST]-[OSR7700-6700]-[FMTMAINPT.EXE]-[7002]
[FMT3]:[LOCALHOST]-[LOCALRESPONSEAGENT]-[FMTMAIN.EXE]-[7003]
```

[ OK ]  [ CANCEL ]  [ APPLY ]  [ HELP ]

FIG. 6

ESR ADMIN (CENTRAL SERVICE CONFIGURATION)

ELECTRONIC SERVICE REQUEST ADMINISTRATOR

| SYSTEM INFORMATION | | CUSTOMER INFORMATION | |
|---|---|---|---|
| FORMATTER CONFIGURATION | CENTRAL SERVICE CONFIGURATION | | FAULT CRITERIA |

COMPUTER NAME *  REMOTEHOST

PORT NUMBER *  7896

─ ELECTRONIC SERVICE REQUEST PACKETS ─

⦿ TEST

SEND PACKET

* REQUIRED

OK    CANCEL    APPLY    HELP

FIG. 7

ESR ADMIN (FAULT CRITERIA DATABASE)

ELECTRONIC SERVICE REQUEST ADMINISTRATOR

| SYSTEM INFORMATION | | CUSTOMER INFORMATION | |
|---|---|---|---|
| FORMATTER CONFIGURATION | CENTRAL SERVICE CONFIGURATION | | FAULT CRITERIA |

| EVENT SOURCE | EVENT TYPE | CATEGORY | EVENT ID | DESCRIPTION | FREQ | DURATION |
|---|---|---|---|---|---|---|
| LX5000 | ERROR | | | | | |
| ESRTESTPACKET | WARNING | | | | 1 | |
| LOCAL RESPONSE | ERROR | | | POWER SUPPLY | 1 | |
| LOCAL RESPONSE | ERROR | | | STATUS CH | 1 | |
| LOCAL RESPONSE | ERROR | | | COOLING DEV | 1 | |
| LOCAL RESPONSE | ERROR | | | POWER UNIT | 1 | |
| LOCAL RESPONSE | WARNING | | | SINGLE-BIT | 5 | 5 |

[ OK ]  [ CANCEL ]  [ APPLY ]  [ HELP ]

ELECTRONIC SERVICE REQUEST GENERATOR FOR AUTOMATIC FAULT MANAGEMENT SYSTEM

CROSS-REFERENCE TO RELATED APPLICATIONS

This application is related to a application, U.S. Ser. No. 09/658,959 which issued as U.S. Pat. No. 6,654,915 entitled "AUTOMATIC FAULT MANAGEMENT SYSTEM UTILIZING ELECTRONIC SERVICE REQUESTS" and which is incorporated by reference herein.

FIELD OF THE INVENTION

This disclosure refers to automatic fault management systems of computer networks and specifically to the generation of Electronic Service Request packets which can seek and access remedial processes when faults occur.

BACKGROUND OF THE INVENTION

Many recent systems and configurations have been developed for use in the detection of faults and inefficiencies of various computer systems and networks. Many of the earlier systems required the attendance of a field engineer who would isolate the fault or inadequacy, and then, after a trouble-shooting operation would replace a given printed circuit card, or change or patch-up certain of the programs which might be operating improperly. Today, rapid response expectations now require an automatic quick request for detection and response.

It is deemed most desirable in system networks using multiple platforms to have some sort of fault detection which can be sensed and reported to a remote station which can analyze the fault and immediately respond with corrective action.

Thus, by having a local monitor in each platform, there could be detected any software or hardware faults which would be logged into a Windows NT Event Log file and then packaged for transport to a central service unit. The present invention focuses on an Electronic Service Request Generator which can be used to initiate a special packet of information for transmittal to a remote communication service for analysis. This is accomplished with no need for additional software or need to re-compile programs when added workstations or new applications are utilized by users of the Automatic Fault Management System.

A specialized Formatter System is subsequently the recipient of the data exported from the subject ESR Generator and is described in a subsequent application.

SUMMARY OF THE INVENTION

An Electronic Service Request generator is provided as a multi-threaded Windows NT service that monitors a Windows NT Event Log for system and application errors occurring in many different platforms connected to and supporting many workstations. Error conditions which require attention from a Central Support Center are logged into the NT Event Log. This can possibly happen from several different sources. When a new entry to the NT Event Log is detected, a Watch thread wakes-up and queries the Event Log. The Event Log is then compared with certain ESR (Electronic Service Request) conditions which are specified in an ESR conditions database. If there is a match, the required messages are extracted from the Event Log by a Send thread. The Watch-Send thread sends information to a Formatter to format the information to meet special standards in a ESR packet format, which is specially suited to the Source Platform on which the error occurred.

The ESR generator module is a multi-threaded NT service. When this service is started, there are a sequence of functional steps which involve: reading the ESR conditions from the database; getting suitable Formatter information from the NT Registry; validating configuration information in the Registry; setting an automatic Winsock port number assignment which is stored in the Registry; executing the appropriate Formatter module; executing the application Event Log Watch thread; executing the System Log Watch thread; and executing the Send thread. This is accomplished without need for re-compiling the source code though new software/applications or hardware may be added to the system being monitored.

GLOSSARY LIST OF SIGNIFICANT ITEMS

APPLET: A small piece of code that can be transported over the Internet and executed on the recipient's machine. Such programs are often embedded in line as objects in HTML documents on the World Wide Web.

APPLICATION LOG: Any NT application can report a Warning, Information or Error to the application log using an API designated ReportAnEvent.

CENTRAL DATABASE: A database that keeps track of configuration and status information for Electronic Service Requests.

CENTRAL SERVICE: A software module that receives an Electronic Service Request packet from a Formatter Program. This packet contains information on system and application errors; provides system and customer information; and describes the severity of the problem. The Central Service schedules and sends the data packet to the Unisys Remote Communications Interface (URCI) for action and resolution.

DATA SEND THREAD: This thread is created during ESR Generator service start-up. It wakes up when either the Application Log Monitor thread or the System Log Monitor Thread has data to send a Formatter module.

ELECTRONIC SERVICE REQUEST: A data packet containing information on system or application errors. This packet is initiated automatically by an ESR Generator, which sends it to a Formatter program for data formatting. The Formatter program sends the packet electronically to the Central Service, which in turn sends it to the Remote Communications Interface (RCI) for action and resolution.

ELECTRONIC SERVICE REQUEST ADMINISTRATOR: A Windows application used to provide the customer, system and connection information required by the Generator, the Formatter programs, and the Central Service.

ELECTRONIC SERVICE REQUEST FAULT CRITERIA DATABASE: A database containing the set of conditions that trigger the generation of an Electronic Service Request.

ELECTRONIC SERVICE REQUEST MONITOR: A Windows application used to configure information required by the Central Service and to view information about Electronic Service Request packets that have been received and processed by the Central Service.

ERROR EVENT: A condition reported as an error by a system or an application, for example, a bad sector on a hard disk. This type of condition requires immediate attention.

ESR ADMINISTRATOR: This is a graphical user interface (GUI) module which provides information to the ESR Generator and Formatter modules in order to initiate the development of an ESR packet for transmittal to the NT Registry for the ESR Central Service module. This module will reside within the ESR Generator module. One additional function of this module is to do "Test Packet" sending. When it is activated, it writes simple information in the NT Event Log, then is processed by the ESR Generator module to a Formatter, passed to the Central Service module, moved all the way over to the Remote Support Center. This is to test the entire packet-send-path from a client to the Central Service, and to a Support Center via modem or via intranet.

ESR CENTRAL SERVICE: (Electronic Service Request Central Service.) This is an executable program that runs as an NT Service. It is controlled by the Windows NT Service Control Manager (SCM). The ESR Central Service receives information on system and application errors via a Formatter Program designated as the ESR Formatter Program. This information is included in a data packet that describes the problem that has occurred and also the severity of the problem. The ESR Central Service then schedules and sends the data packet to the Remote Communications Interface (RCI). The ESR Central Service will then schedule and send the data packet to the Remote Communications Interface. ESR Central Service begins to run at system startup. It can be stopped and started by using the Services function of the Windows NT Control Panel.

ESR CONDITIONS DATABASE: A database containing the set of conditions that trigger the generation of an Electronic Service Request.

ESR GENERATOR: This is an NT Service Program. Since this is an NT service, this service can be stopped and started using the services Applet in the NT Control Panel. When the ESR Generator comes up, it validates all required information in a Registry. The required information involves customer information, system information (serial number, machine style). If any of the required information is missing, the ESR Generator will launch the ESR Administrator program to complete the required information. See also "Generator".

ESR GENERATOR MONITOR: This unit is a functional part of the ESR Generator and wakes-up when there is a new entry in the NT Event Log, then examines if it is required to get attention from the Remote Support Unit. If it does, it will extract necessary information from the NT Event Log, package the data, send it to a properly selected Formatter using Winsock protocol. Depending on the particular application which reports the problem in the NT Event Log, the ESR Generator looks up a Configuration Table to determine which Formatter will process each particular set of reported information. Then, the ESR Generator module sends its information to the properly selected Formatter. The designated Formatter will format the information according to a special Packet Specification. Then it is sent to the Central Service Unit.

ESR GENERATOR SERVICE CONTROL: This is the main thread of the ESR Generator and it is responsible for executing threads, service states and to maintain all threads.

ESRRFU PACKET: This is a "ready-to-use" packet used as a means to verify that the system is ready to send ESR packets and will route the packet to a service provider who will respond to the electronic service request by calling the site involved.

ESR TEST PACKET: This is a test packet used to verify that the electronic service request mechanism is functioning properly.

EVENT: A condition indicating that a potential problem has been detected before significant errors appear, for example, such as low disk space. Action should be taken to prevent it from becoming a more serious problem.

FORMATTER: There are several different Formatters in the ESR system. A selected one of several Formatters are used depending on the application and the workstation which reports a service request. Some applications write a specialized ESR Packet Format in the Event Log, while some applications write only related information. The ESR Generator takes information off the NT Event Log and sends it to a properly selected Formatter. Then each Formatter will fill-in any missing information, such as system information, and customer information, in order to create a final packet for transmission to a remote service center.

FORMATTER PROGRAM: A stand-alone application that takes raw data extracted by the Generator from the Windows Event Log and formats it to comply with the Electronic Service Request packet specifications. Data can then be understood by the Unisys Remote Communications Interface (URCI).

GENERATOR: A software service that monitors the Windows Event Log. When the Generator detects an event that meets a predefined set of conditions, the Generator extracts information from the Event Log and sends it to a Formatter program for proper data formatting.

HARDWARE/SOFTWARE FAULT DETECTOR: This is a unit which is used in each client's computer platform in order to sense, measure and detect any type of hardware or software fault which may occur in order to notify an NT Event Log in the ESR Generator Module.

INFORMATION EVENT: A condition indicating the status of an event in a system or an application, for example, "Installation completed successfully".

ISC: Intel Server Control is an Intel server management application.

NACK: Negative acknowledgment (NACK). A data packet returned by the Remote Communications Interface (RCI) to indicate that an Electronic Service Request packet failed to process. The packet also includes an error code and a descriptive error message.

NT APPLICATION LOG MONITOR THREAD: This thread is created during ESR Generator service launching time. This thread wakes up when the application Event Log reports an entry. Also called a Watch Thread.

NT SYSTEM LOG MONITOR THREAD: This thread is created during ESR Generator service start-up by the ESR Generator Service Control. It wakes up when there is a new entry in the System Event Log.

ODBC: This is the open database connectivity concept used by Microsoft WOSA structures. It provides an interface with a common language for Windows applications to gain access to a database on a network.

PACKET HEADER: This is a field which involves a four-byte field called a preamble field to indicate the start of an electronic service request transaction, and it also includes a data length field which is a ten-byte ASCII field containing the size, in bytes, of the data packet.

RAS: Remote Access Service.

REGISTRY: The Registry is the central storage for all configuration data. The Windows system configuration, the computer hardware configuration, configuration information about Win32-based applications, and user preferences are all stored in the Registry. The ESR application stores much required information data into this NT registry, and can be accessed by any ESR related applications.

REMOTE COMMUNICATIONS INTERFACE (RCI): This is a remote unit for receiving test packets from the Central Service unit in order to check whether the network mechanism is functioning correctly.

SACK: Successful acknowledgement (SACK). A data packet returned by the Remote Communications Interface (RCI) to acknowledge that an Electronic Service Request packet was processed successfully. The packet also includes the customer contact number assigned by the Remote Communications Interface (RCI).

SECURITY LOG: When some other system tries to get into the network, it must be found to be an authorized system and is checked by the Security Log.

SEND TEST PACKET: This relates to the three types of test packets which are utilized for the electronic central system to test out the electronic service request process for connection with the Remote Communication Interface (RCI).

SERVICE CONTROL MANAGER (SCM): A Windows application that can start, stop, pause, or continue Windows services. SCM maintains a list of services installed in the Windows operating system, and it can add or remove services from this list.

SYSTEM: A unit of software and hardware components that operates differently. For example, an ES7000 Unisys Corp. system can be configured into multiple partitions. Each partition can run a different operating system, one of which can be Windows.

SYSTEM LOG: The system can report Warning, Information or Error events to the System Log.

THREAD: In programming, a process that is part of a larger process or program. Also, in a data-tree structure, a pointer that identifies the particular node and is used to facilitate traversal of the tree. Sometimes used to denote a series of messages and replies related to a specific topic.

TRACE SETTING: The ESR Generator Trace is a diagnostic tool to enable the tracking of important information during ESR transactions.

WARNING EVENT: A condition indicating that a potential problem has been detected before significant effects appear, for example, low disk space. Action should be taken to prevent it from becoming a more serious problem.

WATCH THREAD: This is a thread created during ESR Generator Service start-up time. This thread is awakened when a new entry is detected. This thread notifies the Application Log Monitor Thread and the System Log Monitor Thread to process the new entry.

WINDOWS: An operating system developed by Microsoft Corporation.

WINDOWS NT EVENT LOG: The NT Event Log is a service that starts whenever the NT is booted. It reads and writes messages to the Event Log files. Event messages are reported by any NT application so that these messages are accessible by any application or any user. There are three types of Event Logs: (i) Application Log; (ii) System Log; and (iii) Security Log. A Windows tool used to log system, application, and security events reported by a running system or application. The degree of severity of these events is determined by the reporting system or application.

WINSOCK: This is an industry-standard file transfer which is a shortened name for Windows Sockets. It involves an application programming interface standard for software that provides a TCP/IP interface under Windows. The Winsock standard was developed out of a "Birds of a Feather" (BOF) discussion that arose among software vendors at a UNIX conference in 1991 and gained support of software developers including Microsoft. Since this Winsock protocol is platform independent, the Windows NT machine or a UNIX machine can send such a packet to the Central Service unit for transmission.

WOSA: This is Windows Open Systems Architecture.

DESCRIPTION OF PREFERRED EMBODIMENT

Figure 9:
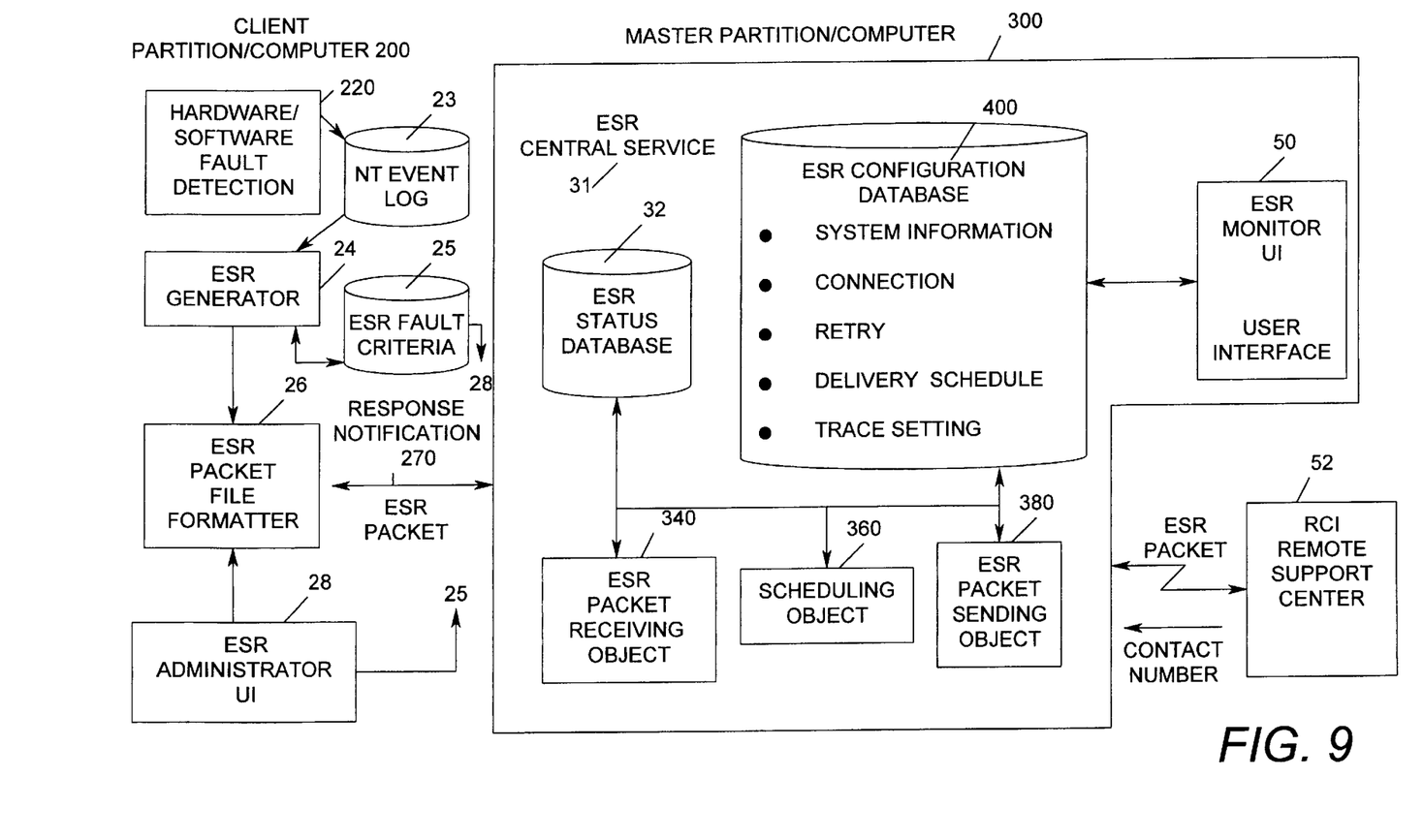
FIG. 9 is an overall block diagram showing the major elements involved in an automatic fault detection system, which uses the ESR Generator.

FIG. 9 shows an overall drawing of the Electronic Service Request (ESR) System as was described in the issued U.S. Pat. No. 6,654,915 entitled "AUTOMATIC FAULT MANAGEMENT SYSTEM UTILIZING ELECTRONIC SERVICE REQUESTS". As seen in FIG. 9, there is a first partition called the "Client-Server Partition/Computer" 200 and there is a second partition (NT server) called the "Master Partition/Computer", 300.

The Client-Server Partition/Computer 200 is seen to have a hardware/software fault detection unit 220 which connects to an Electronic Service Request (ESR) generator 24, which then communicates with a ESR Packet File Formatter 26. The ESR Formatter 26 also retrieves instructions from the NT Registry. The ESR Packet File Formatter 26 is provided with a communication link 270 to the Master Partition/Computer, 300. This enables the transmission of an ESR packet to a Remote Communications Interface 52 (Remote Service Center). Then a response, called the Response Notification occurs via channel 270 back from the Central Service 31.

The ESR Generator 24 includes a Windows NT Event Log 23 which is monitored by the ESR Generator 24 and which also monitors the packet formatter 26. The ESR generator 24 works with the Fault Criteria Conditions Database 25 to compare and identify errors. Subsequently, a data packet will be formatted by Formatter 26. The ESR Administrator 28 can access the Fault Criteria Conditions Database 25.

The Central Service 31 is seen to consist of a ESR status database 32 which is connected to the ESR packet receiving object, 340. Both of these units are then connected to a Scheduling Object, 360, and also an ESR-packet sending object 380. The Central Service 31 connection is also made to the ESR Configuration Database 400 which holds system information, connection information, retry information, trace information and delivery schedules.

Then, peripherally connected to the Central Service 31, are two other units, one of which is the ESR Monitor User Interface (UI) 50 and the Remote Communication Interface (RCI 52) which connects to the Central Service 31 through use of a tracking number.

The ESR Central Service 31 is an executable program that runs as a background task and is controlled by the Service Control Manager (SCM). The SCM is part of the NT and is utilized through the screen of FIG. 6.

The ESR Central Service 31 will receive information on system errors, application errors, or peripheral errors from the Electronic Service Request (ESR) file Formatter. This particular information is then included in a data packet that describes the problem and the severity of the problem. The Central Service 31 then schedules and sends the data packet to the Remote Communications Interface (RCI 52) which is in the Remote Service Center. The Central Service 31 has both full recovery and also a retry algorithm when communicating to the Remote Communications Interface (RCI 52). This service runs at the system start-up and it can be stopped and started by using the services function of the Windows NT control panel applet.

The ESR Central Service 31 provides for central processing and the management for all various types of these ESR packets which describes the problem and its severity. This provides an open solution because any application can send a ESR packet to the Central Service Unit 31 that handles the receiving, sending, scheduling, monitoring, and fault recovery of ESR packet sending over to the Remote Communications Interface (RCI 52).

The Electronic Request Central Service 31 is actually a component that is easily integrated with any type of ESR (Electronic Service Request) detection and generation programs. Further, the Central Service Component is reusable and capable of communicating with any sort of applications running from different operating systems which are using the standard WINSOCK protocol. The Electronic Central Service 31 is a reusable module and has the advantage of using an industry-standard to communicate with other components to deliver a complete electronic service request solution.

A pre-defined set of conditions will trigger an Electronic Service Request via an Electronic Service Request fault criteria grid which is organized in a set of columns as seen in Table I.

TABLE I

| COLUMN | DESCRIPTION |
|---|---|
| Event Source | System or application reporting a problem, for example, Local Response Agent or Fault Event. |
| Event Type | Type of event: information, warning or error. |
| Event Category | Event classification as defined by the event source. |
| Event ID | Event identification that is specific to the Event Log entry. |
| Description | Brief explanation of the problem reported by the system or application. |

TABLE I-continued

| COLUMN | DESCRIPTION |
|---|---|
| Frequency | Number of times an event must occur before an Electronic Service Request is generated. |
| Duration (Days) | The interval in which an event occurs, for example, two times in four days. |

Figure 1A:
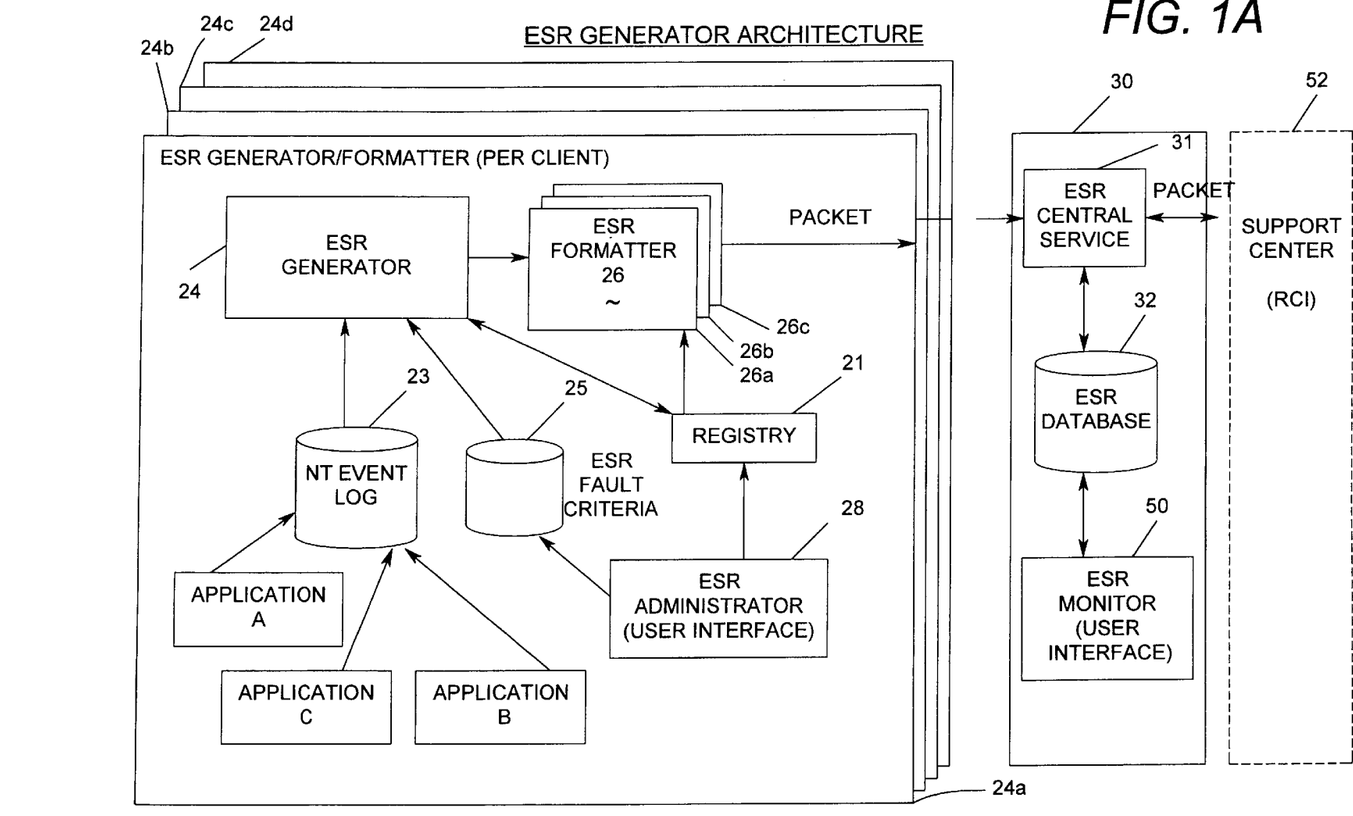
FIG. 1A is a drawing of the ESR Generator architecture.

ESR GENERATOR SERVICE: As seen in FIG. 1A, there is shown the ESR generator 24 which receives information from the hardware/software fault detection module 220 (of FIG. 9). Then, connected to the ESR generator 24 is a Windows NT Event Log 23 which will provide a log of all events deemed to be inappropriate, irregular, or in error.

Further in regard to FIG. 1A, the ESR generator 24 is seen connected to the ESR fault criteria storage unit 25 which also connects to the ESR Administrator-User Interface 28, (UI).

As a result of the interaction of the ESR generator 24 with the Event Log 23 and the Fault Criteria Conditions Database 25, the information from the NT Event Log will be sent to the ESR Packet File Formatter 26 which will create the appropriate packet to be sent to the NT server 30 for eventual transmission to the Remote Support Center 52.

As seen in FIG. 1A, the ESR Generator architecture involves a multiplicity of ESR Generator Service Modules 24a, 24b, 24c, 24d, etc., which correlate to specialized Formatters 26a, 26b, 26c, etc., each specially suitable for each one of the types of platforms which may originate a source-error signal.

The Registry Nodule 21 is an information Database Source which indicates configuration information to show what Event Source will be connected to which one particular Formatter for utilization. As seen in FIG. 1A, each particular application, A, B, C, is reported into the NT Event Log 23.

The ESR generator 24 of FIG. 1A is a multi-threaded Windows NT service that monitors the Windows NT Event Log 23 for system and application errors. Any error conditions requiring attention from the Central Support Center are logged into the NT Event Log 23 and may arise from possibly several different sources (Event Source).

When a new entry to the NT Event Log 23 is detected, a Watch thread (FIG. 1B) wakes up and queries the Event Log 23. The Watch thread will compare the Event Log with the ESR conditions specified in the ESR Fault Conditions Database 25. If the Watch thread (23w, FIG. 1B) matches the condition specified in the Fault Conditions Database 25, then the system will send information to the Formatter 26 to cause it to format an appropriate specialized ESR format packet according to the conditions specified in the Database 25.

Figure 1B:
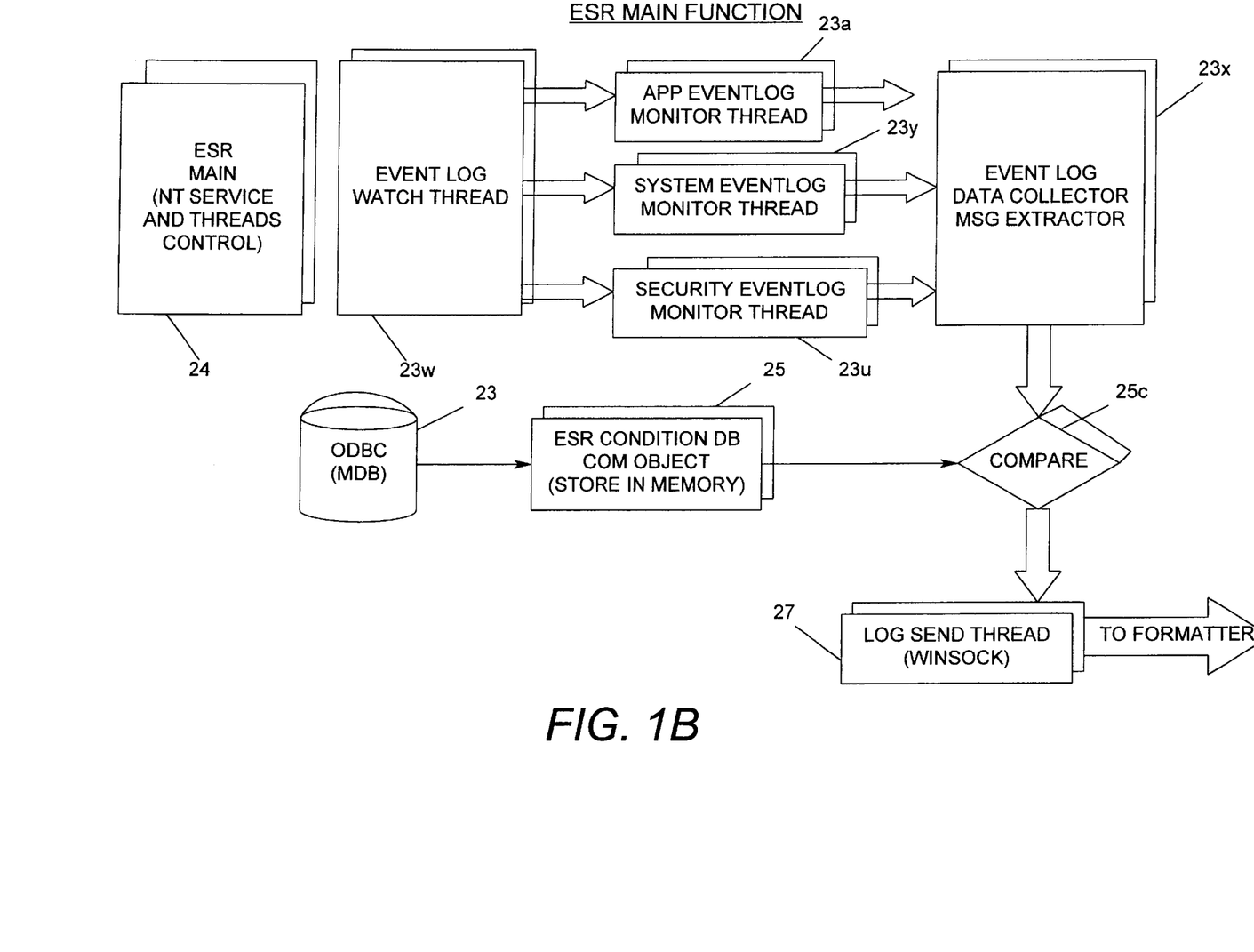
FIG. 1B is a drawing illustrating details of the ESR Generator functionality and how monitor threads are collected for transmission to the Formatter.

When the errors are sensed and they meet a set of conditions specified by the Conditions Database 25, then the ESR Generator Service 24 will initiate the following:

1. It extracts error information from the Windows NT Event Log 23;
2. The generator service creates a ESR packet that contains a description of the error;
3. The generator service sends the data packet to the ESR Formatter program 26 which then converts raw data into a specific data format that meets a specified packet specification;
4. The generator service then sends packets to the Formatter 26 using a synchronous Winsock connection (FIG. 1B).

After this, the NT server 30 will forward the packet to the Remote Service Center 52 for subsequent corrective response action.

ESR GENERATOR FUNCTIONS: When the ESR generator module 31, FIG. 1B operates, it operates as a multi-threaded NT service. When this service is started, then a sequence of functional steps are initiated as follows:

(a) reading of the ESR conditions from the Fault Conditions Database 25;

(b) getting the Formatter information type-class from the Registry 27 (FIG. 1A);

(c) executing operations in the Formatter module 26, i.e., with the appropriately selected Formatter unit such as 26a, 26b or 26c, etc.;

(d) executing the applications for the Event Log Watch thread 23w, FIG. 1B;

(e) executing the Send thread, 27.

CONFIGURATIONS SET-UP—ESR ADMIN MODULE 28: Using the Windows-based proprietary ESR Administrator user interface 28, the ESR Administrator can specify or modify such information as follows:

(i) system style and serial number;

(ii) customer name, address and phone numbers;

(iii) the connecting Winsock ports;

(iv) the type of conditions that must be met before the ESR packet is generated.

Referring to FIG. 1B, there is shown the functionality of the Electronic Service Request operations. The ESR Generator 24 provides NT service and thread control. The Event Log 23 works in conjunction with the Conditions Database 25 in order to utilize a comparison unit 25c.

When an event signal is indicated, the Event Log Watch thread 23w will provide monitor thread information to the Application Event Log 23a or to the System Event Log monitor thread 23y, or to the Security Event Log monitor thread 23u. Each of these monitor threads will be fed to the Event Log data collector and message extractor 23x so that the Watch thread information will be fed to the comparison block 25c for comparison with the output of the Conditions Database 25. If a suitable match occurs in relationship to the Conditions Database 25, then a signal will be provided to the functionality designated as the Log Send Thread which uses the Winsock format 27 to send information to the Formatter for development of a transmission packet.

Figure 2:
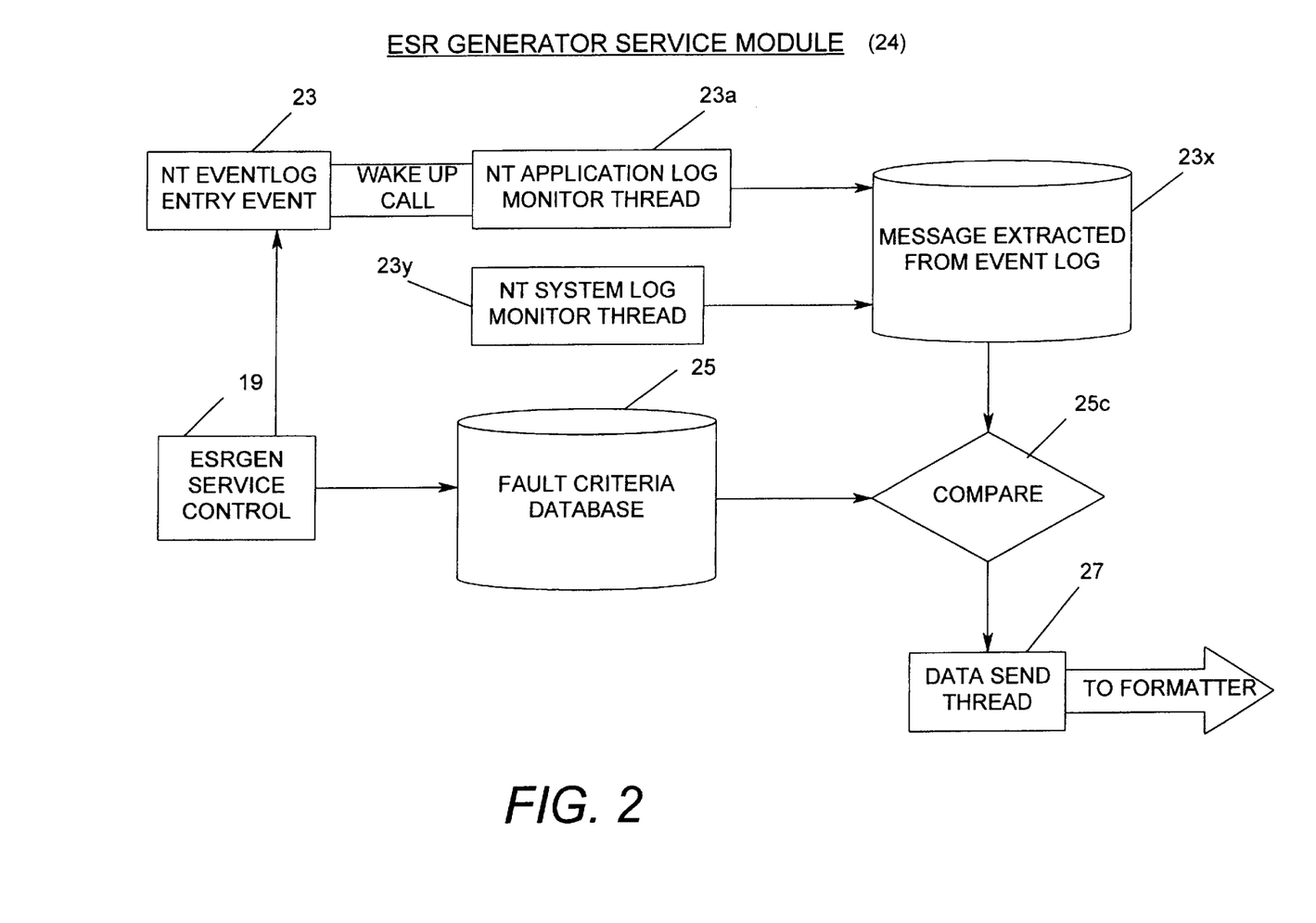
FIG. 2 is a drawing illustrating elements of the ESR Generator Service Module.

FIG. 2 is another exposition for the ESR generator service module which indicates that when there is an entry event at the NT Event Log 23, there is a signal or wake-up call which is provided to the NT Application Log Monitor Thread 23a, and also to the NT System Log Monitor Thread 23y. Optionally, but not shown, there could also be a Security Event Log Monitor Thread as was seen in FIG. 1B. Any one of these signals can then be provided to the message extractor 23x which is extracted from the NT Event Log 23. The extracted message from 23x is fed to the comparison unit 25c where the signal from the False Criteria Database 25 is compared with the message extracted from 23x. As a result, if a match is found that warrants a signal, then, at the Data Send Thread 27, there will be provided a Data Send Thread which is sent to the Formatter unit for further processing. Also in FIG. 2, there is seen the ESR generator service module 19 which provides the signal coordination for each of the units shown in FIG. 2.

Figure 3:
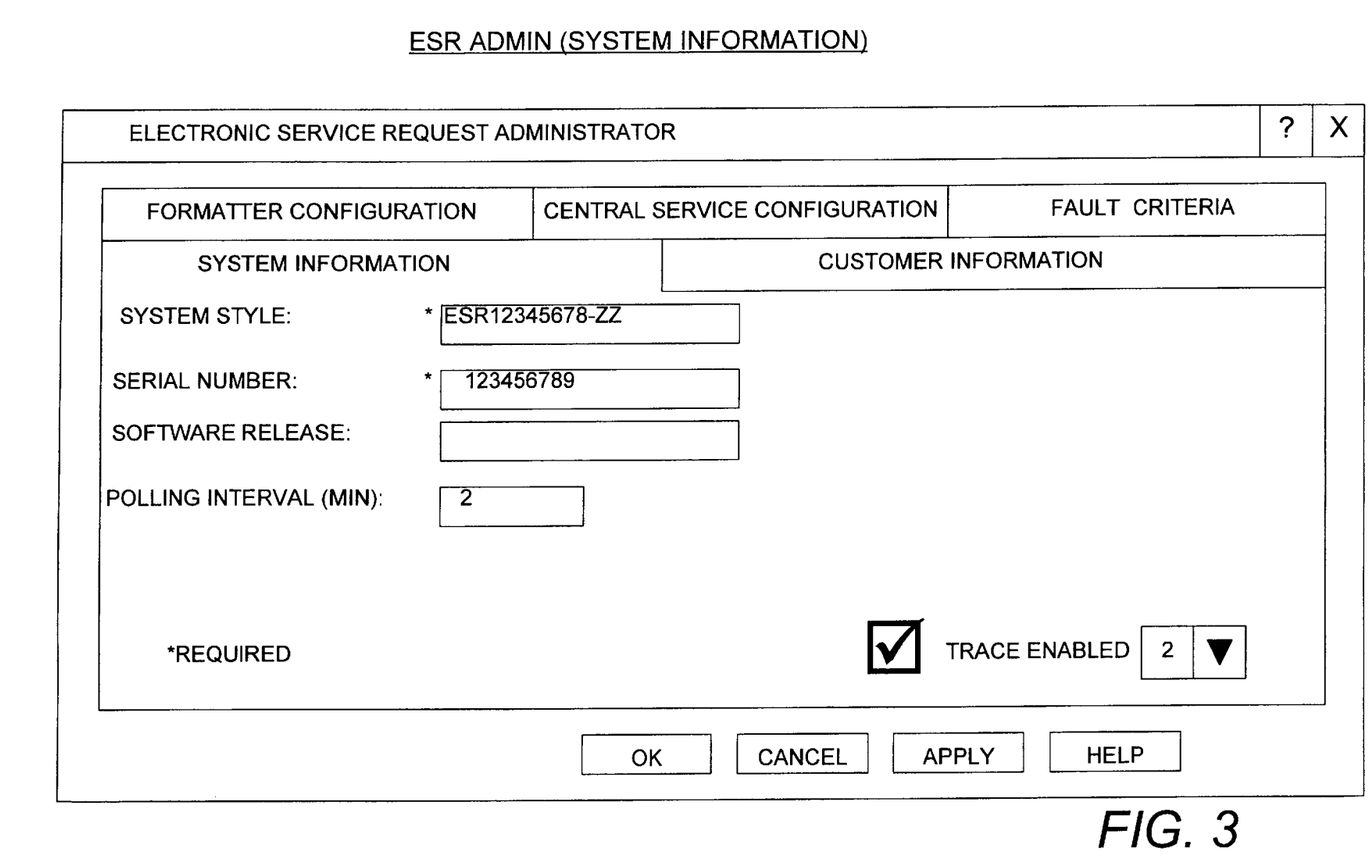
FIG. 3 is a screen designated as the system information entry dialog screen.

FIG. 3 is an illustration of a window screen which is the system information entry dialog screen for the ESR administrator. This provides the System Style indicator with serial number and period of polling between events. This screen shows a two-minute polling interval.

Figure 4:
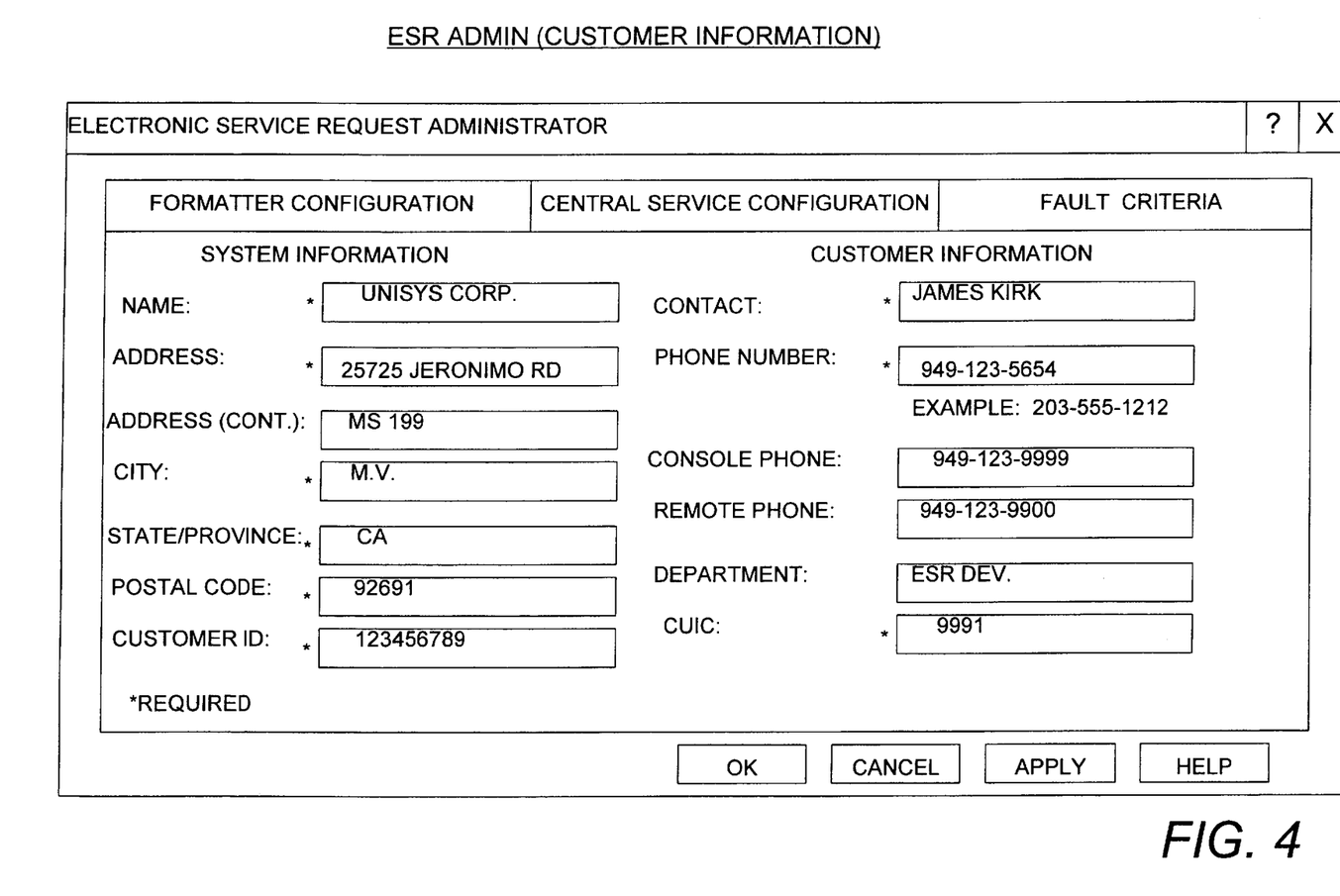
FIG. 4 is a screen used for entering basic customer information that is required.

Then customer information is provided on another screen shown in FIG. 4 for the ESR Administrator. FIG. 4 is a window screen of the ESR Administrator which shows the customer information which is required. This information provides customer name, address and ID, plus telephone contact information.

Figure 5:
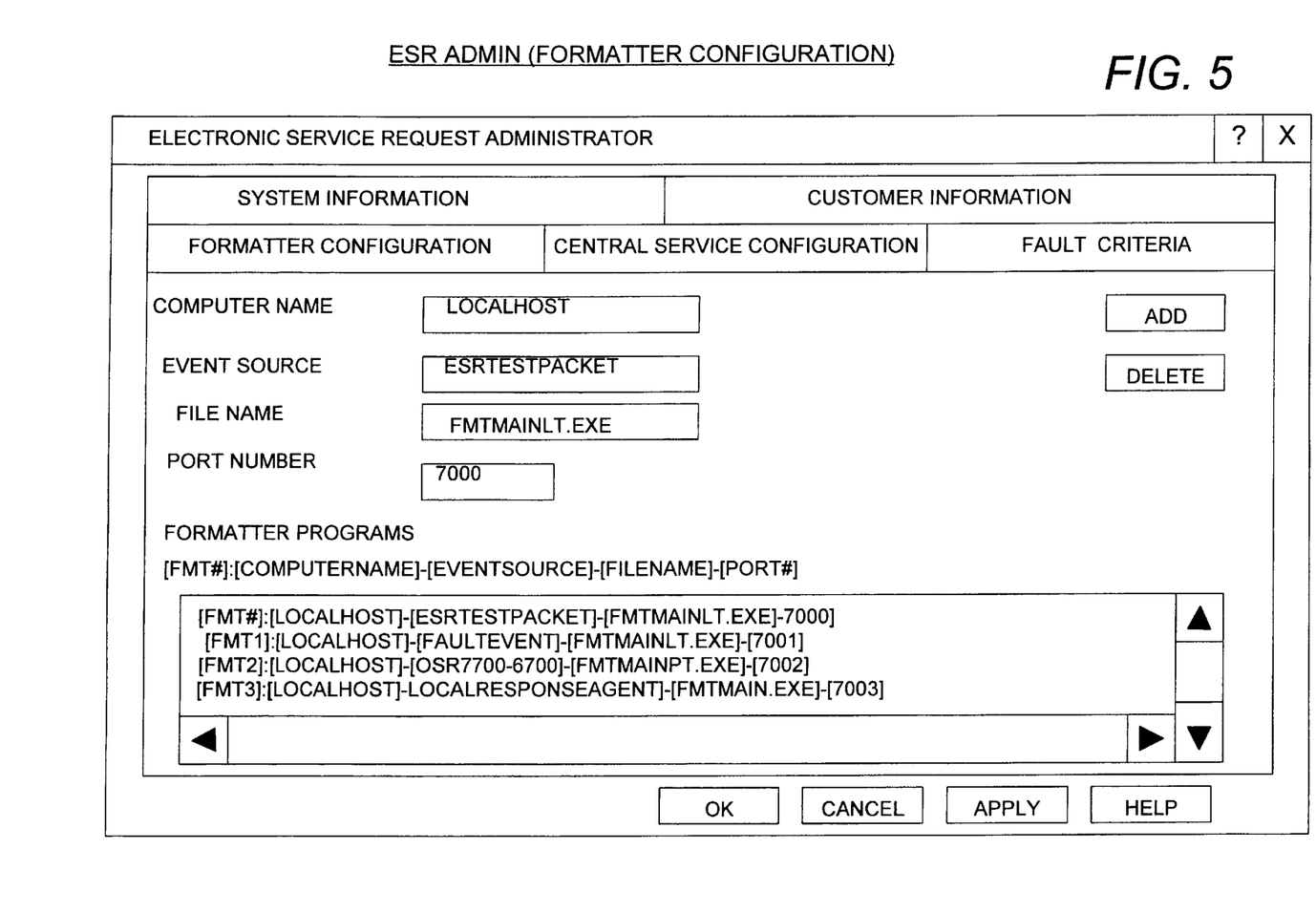
FIG. 5 is a screen for Formatter Configuration which is used to indicate which Event Source is to be used with which particular Formatter.

FIG. 5 is an ESR Administrator window screen which shows the Formatter configuration for the ESR Central Service. This information provides the Winsock port number and the file name where the ESR Central Service Module resides, plus the Event Source and computer name. The host name is translated into an IP address in the program.

Figure 6:
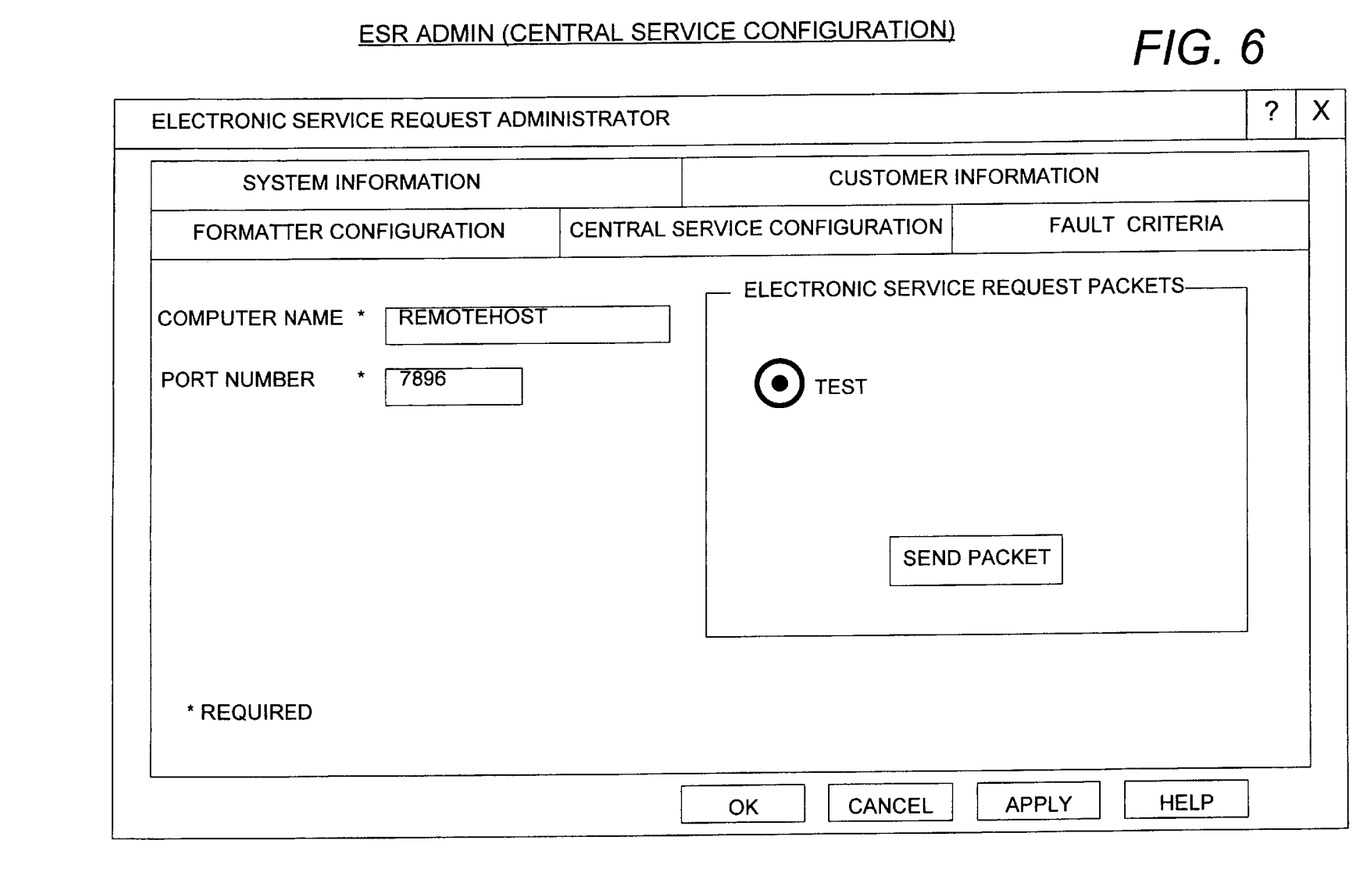
FIG. 6 is the Central Service Configuration screen wherein a selected computer and port number is selected for sending a Test Packet to verify connection to a Remote Service Center.

FIG. 6 is a window screen indicating the ESR Administrator Central Service Configuration. This screen provides the Winsock Port Number and configures a specially selected Formatter to be used to send information to the Central Service 31. It also provides a "Send Packet" button to send a packet to the Remote Communication Interface (RCI 52) as a test to check the communications link.

Figure 7:
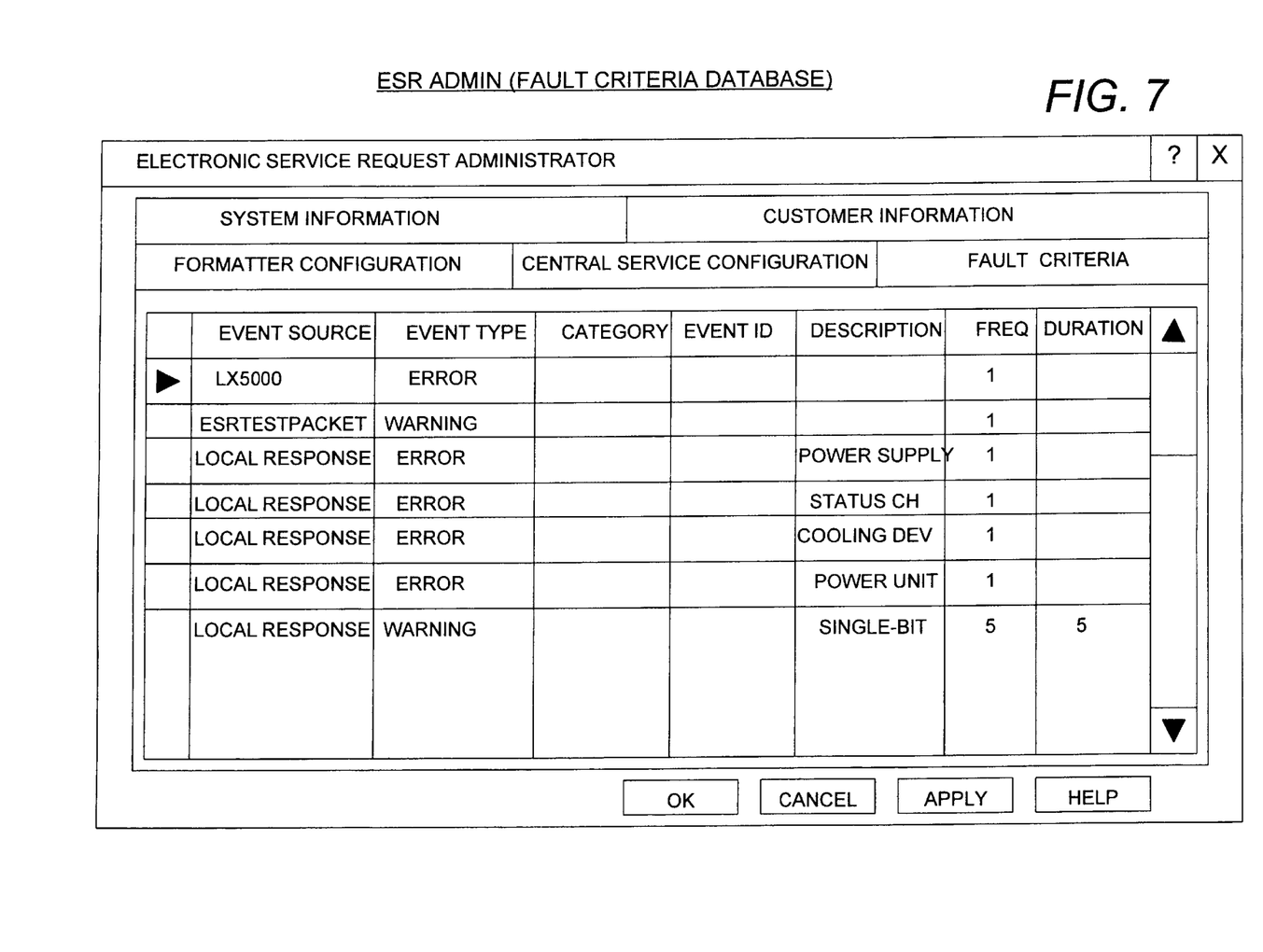
FIG. 7 is the Fault Criteria Database Screen which relates each Event Source and Error Type to a separate Formatter and number of error reports.

FIG. 7 shows the screen for the Fault Criteria Database to indicate Event Source, Event Type, and Description, plus the frequency that such a warning report is made in a selected period, as for example, 24 hours.

In the event when there is detection of a single-bit memory error, and the "report frequency" is more than "1", (FIG. 7 shows five reports), then the ESR generator service starts to count frequency for the period of the Duration time. For example, if a single bit memory error is detected (warning) 10 times in 24 hours, it will then generate the Electronic Service Report ESR. This fault sensing operation (duration and frequency) can be set differently according to various circumstances. There is no special default value used at the moment.

NT EVENT LOG QUERY FUNCTION: This is a function query where only "newly-entered" NT Event Logs are involved. Then it works to compare each new item of the log contents against each of the ESR Fault Conditions. When the ESR Condition is met, the Event Log will then notify the ESR Send Thread, 27 (FIG. 1B, FIG. 2).

APPLICATION/SYSTEM EVENT LOG WATCH THREAD (FIG. 2): These are the threads that monitor the NT Event Log 23 for a new log entry by using the Win 32 API (Notify Change Event Log). When this event occurs, it calls a function designated "Query Event Log Function". If the Query Event Log Function should fail, the system will try again.

SEND PACKET THREAD: The ESR Send Thread (27, FIG. 1B), gets all of its information from the NT Event Log 23, connects up to the socket and then sends the packet developed for processing by the Formatter 26 (FIG. 1A). The first packet line will indicate 10 bytes to designate packet length. The Formatter module 26 reads the first line, which is the packet length, in order to allocate memory dynamically. If Winsock 27 cannot connect or the Send operation fails, it will try 10 times before it gives up its operations.

TRACE FILES: There are 3 levels of trace files which can be activated from the ESR Admin screen of FIG. 3. The trace file is created under a %SystemRoute%\System32 directory as an ESR general document file. If the trace option is enabled, it will generate a level 1 trace file. The level 1 trace file will only record Error conditions and the basic connection status. The level 2 will record all error conditions plus connection status and some other information. The level 3 will record all of the above, plus the actual packet information. This can create a rather large file size.

ESR INFORMATION STAMPS: Upon a successful ESR transmission to the Formatter 26, the associated NT Log record information will be stored in the Registry 21, FIG. 1A, so that this will not be processed again at a later time or when it is rebooted.

REGISTRY 21 (FIG. 1A): Most of the information needed by the ESR generator service and the Formatter 26 are stored in a Registry tree, as follows:

HKEY_Local_Machine\Software\Unisys\ESR\

Whenever the ESR packet is sent to the Formatter 26 successfully, it then logs the Event ID, also the number of the Records, the Event Log time written, and a Record number into the Registry. For example:

EKEY_Local_Machine\Software\Unisys\ESR\Event
  LogInfo\Application
HKEY_Local_Machine\Software\Unisys\ESR\Event
  LogInfo\System The Electronic Service Request (ESR) process will be seen to consist of five major elements or operations:

(a) a sending application;
(b) an ESR Data Packet;
(c) a transport mechanism;
(d) a service (receiving) management application;
(e) the service management systems (for example, such as RESPOND SERVIS II, Call Track, and so on).

ESR GENERATOR SERVICE: This is also called the ESR Generator, and is an NT service which monitors the Event Log 23. The service has a user interface called the ESR Administrator 28 (FIG. 1A) that interacts with Event Log Database 23 which is used to describe the "types" of Event Log entries that will warrant the generation of an Electronic Service Request.

When the service detects an ESR condition, it creates a packet describing the failure, and then passes the packet onto the ESR generation application which is called ESR-Formatter 26. The Formatter creates an ESR Packet based on the information provided by the ESR generator.

Each machine that is being monitored will have a Generator/Formatter module installed. The module monitors "multiple" applications (Event Sources) on the machine. As seen in FIG. 1A, element 26 actually involves different sets of Formatters 26a, 26b, 26c, etc. The Formatter is packaging the packet according to a packet specification. Since each application will put different information into the Event Log, this involves different flavours of Formatters that will pull different information off of the Event Log entry and package the information according to a defined specification. As an example:

(i) Event source "A"
  Event message:
    "Critical fan failure has occurred on fan #1".
    "Fan speed fell below threshold".
(ii) Event source "B"
  Event message:
    "Type: Low threshold crossed".
    "Component: cooling sensor"
    "Severity: warning"
    "Instance: 1"

Thus, there is a Formatter ("FmtA") that understands the first format and knows how to interpret the message. Similarly, another Formatter ("FmtB") will need to understand how to interpret the second type of message. The end result from both of these Formatters will ultimately be:

ProblemText-FanFailure
AlarmType=Environmental
PerceivedSeverity=Degraded
ProbableCause=heating/cooling
System Failure
Unit=1

An ESR Packet contains information like [Customer Data], [System Data], [Event Data], [FRU (Field Replaceable Unit)], and [ESR]. At the time of sending a ESR, all the essential data is collected from the NT Event Log 23, the Operating System and the NT Registry 21. The ESR Packet is then forwarded via Winsock 27 to a Windows NT system running the ESR Formatter transmitter module.

Figure 8:
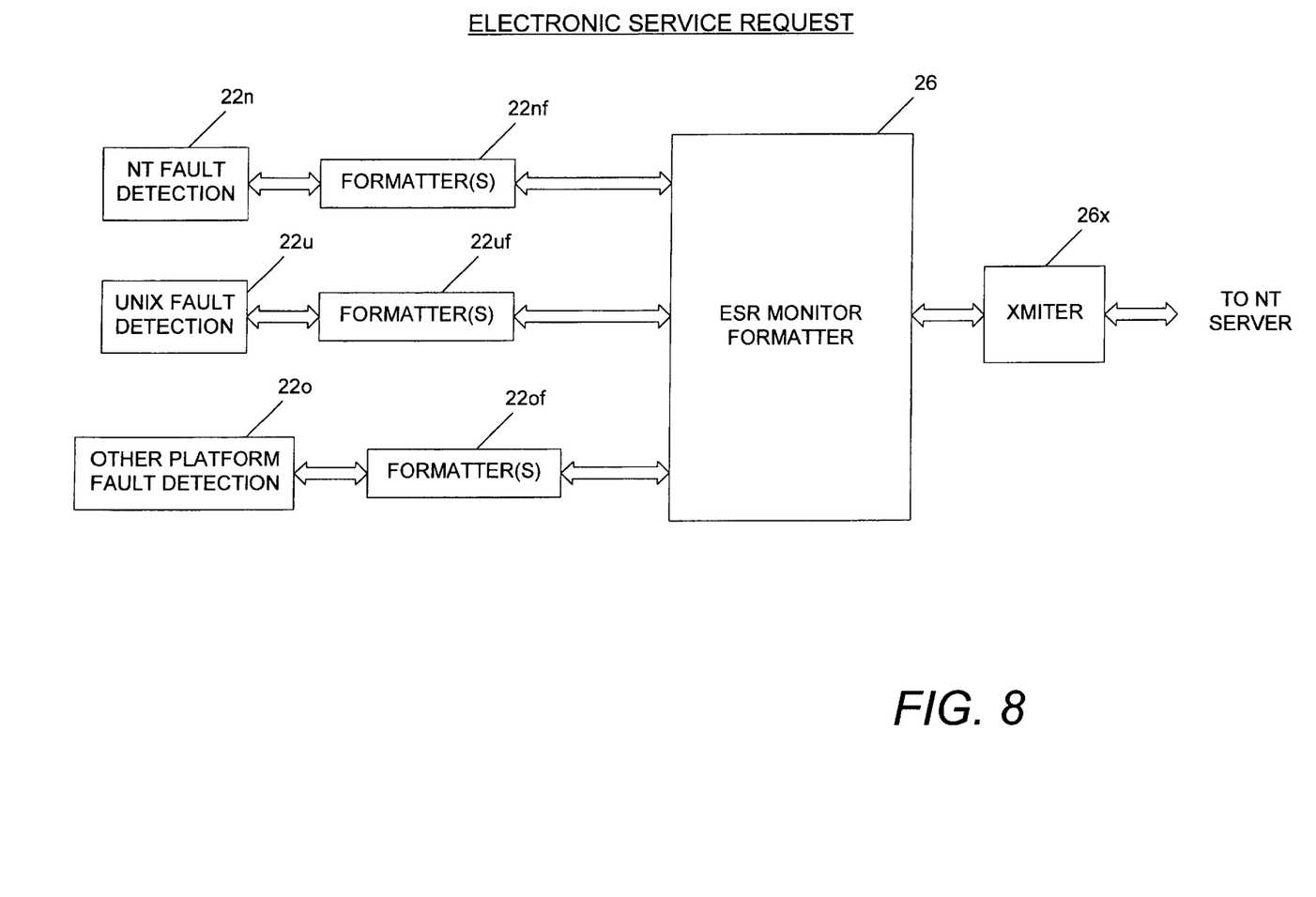
FIG. 8 is a diagram indicating special Formatters for each different platform being monitored.

FIG. 8 is a generalized view of the handling for Electronic Service Requests. There may be several different types of fault detection shown as NT Fault Detection 22n, UNIX Fault Detection 22u and other platform fault detections shown as 22o. These are subsequently handled by the selected appropriate Formatters respectively, 22nf, 22uf, and 22of, which send their output to the ESR Monitor Formatter 26 from whence the transmitter 26x can forward the information to Central Service 31. The ESR transmitter module 26x consists of two components which involves the ESR-Central Service, and the ESR monitor. The ESR Central Service is an NT service. It receives packets from the ESR generation module 24, records them in a database 32, FIG. 1A, and schedules them for transmission via Central Service 31, to the Remote Service Center 52. The Monitor User Interface 50 (FIG. 1A) is a Windows application which allows the user to manage the ESR Database 32 and to configure operational parameters.

The ESR Administrator User-Interface 28 will (i) display information related to each ESR, that is, to show the status, data/time generated, and its priority; (ii) allow the User to configure the delivery schedule; and (iii) allow the user to view, to delete, and to send individual Electronic Service Requests.

The ESR Packets are sent to the Remote Service Center 52 via Winsock over a dial-up networking. The Administrator Database 28 is updated to reflect the acknowledged successful or non-successful response (SACK, NACK) from the Remote Service Center 52.

The ESR transmitter module 26x, FIG. 8, provides a central location for storage and management of the ESR Packets. It is an open solution, in that an application can send (via Winsock) the ESR Packet and expect that the packet will ultimately be sent to the Remote Service Center 52.

Now, referring to FIG. 2, there is shown a functional drawing of the ESR generator module 24. Here, the NT Event Log 23 and the ESR Conditions Database 25 provide inputs to a comparison decision block 25c to determine if any of the Electronic Service Request conditions are met. If this is the case, then the ESR module 24 will generate a data packet using NT service information from Database 25 for comparison via 25c with the result that a Winsock data transmission thread is sent via Log Send Thread 27.

FIG. 1B further shows some of the main functions of the Electronic Service Requests. The Electronic Service Request NT Service and Threads control 24 is shown through which an Event Log Watch Thread 23w can send various different Event Logs such as the Application Event Log Monitor Thread 23a, the System Event Log Monitor Thread 23y, or the Security Event Log Monitor Thread 23u. These are sent to the Event Log data collector message extractor 23x. Additionally, the Database 23, FIG. 1A, is connected to the ESR Fault Criteria Condition Database 25 which is stored in memory and provides an input to the comparison function 25c (FIG. 1B) which compares the input from the message extractor 23x (FIG. 2). The output is then provided to Send Thread module 27 which logs a thread to be sent via Winsock to the Formatter.

As seen in FIG. 1A, each platform is provided with it own Service Request Generator/Formatter and all of the remote site information is stored in the Registry 21.

This is indicated in FIG. 1A to show that the generalized ESR Generator/Formatter designated 24 is actually a set of modules designated 24a, 24b, 24c, 24d . . . etc., which is specifically oriented to each platform in the network.

Any new platforms which are later added or removed do not change system operation or require new software applications in order to effectuate the fault sensing and information delivery to a Remote Central Interface Unit for diagnosis and response.

Described herein has been an Electronic Service Request Generator for an automatic fault management system where multiple platforms are monitored for hardware and software faults. Each reported fault is placed in an Event Log and compared with a fault condition database to sense the need for further action. If further action is required, an appropriate Formatter is selected to initiate the preparation of an Error Packet to be sent to a Remote Service Interface which can subsequently respond with help to handle the problem.

What is claimed is:

1. A method for selecting fault signals from components in a network of multiple platforms for transmittal to a selected Formatter unit comprising the steps of:

(a) receiving operating information from components residing in multiple platforms of a network and wherein step (a) includes the step of:
        (a1) placing said operating information data into an NT Event Log;
    (b) comparing said operating information with a set of pre-selected fault standards wherein step (b) includes the steps of:
        (b1) pre-setting fault parameters in a fault criteria conditions database for each type of component in the network;
        (b2) comparing each said operating information data in said NT Event Log with said fault parameters in said fault criteria conditions database;
    (c) selecting those sets of operating information which match said fault standards wherein step ((c) includes the step of:
        (c1) finding those particular operating information data which fall within said fault parameters;
        (d1) utilizing an Electronic Service Request Administrator for sending test packets to verify the connections to a Remote Service Center;
        (d2) storing configuration data in a Registry Unit for verifying the successful generation of said specialized fault information signals.

2. A system for selecting fault signals from components in a network of multiple platforms, in an automatic fault management system, for transmission to a specialized Formatter unit, comprising:

(a) means to receive fault information from a fault wherein said means to receive fault information includes:

(a1) Electronic Service Request Generator means for extracting error information from an Event Log for transmission to a Formatter unit including:
            (a1a) Event Log means for recording fault signals received;
            (a1b) Fault criteria condition means establishing parameters which constitute an actionable fault;
            (a1c) Registry means for recording an Event ID, Event Log Time, Event Record number and Events which have already been processed;
            (a1d) User Interface Administrator means for identifying the particular Formatter to be selected for processing for each particular type of fault condition;
            (a1e) a plurality of Formatter units, each of which is oriented to a particular component in each platform in the network;
    (b) means to compare said fault information to a set of fault standards;
    (c) means to select those faults which match said fault standards;
    (d) means to initiate a specialized information packet to a selected Formatter unit suitable for processing said fault information.

3. A system of providing fault detection information to a formatting unit comprising:

(a) said Event Log watch thread means for monitoring an Event Log monitor thread means and dispatching various thread lines;
    (b) said Event Log monitor thread means for providing an application Event Log, a system Event Log, and a security Event Log, each of which to be conveyed to an Event Log data collector and message extractor;
    (c) said Event Log data collector means for receiving said Event Log monitor threads and conveying them to a comparison means;
    (d) memory means providing an Electronic Service Request conditions database for storing proper operating parameters for various component areas of said computer network;
    (e) comparison means for receiving messages from said Event Log data collector means and from said conditions database in order to select those component areas which do not fulfill the proper parameter conditions;
    (f) send thread means for conveying those threads of data which do not conform to said proper parameter conditions and sending them to a Formatter means.

* * * * *